(12) United States Patent
Gowdar et al.

(10) Patent No.: US 11,981,795 B2
(45) Date of Patent: *May 14, 2024

(54) MATERIAL CREATED FROM POLYMER AND OTHER MASS WHICH IS ENTIRELY, PARTIALLY OR SUBSTANTIALLY COMPOSED OF RECLAIMED MIXED MATERIAL

(71) Applicant: REGEN-COMPOSITES INTERNATIONAL CORP., Winnipeg (CA)

(72) Inventors: Prakash Gowdar, Winnipeg (CA); Kevin Danner, Winnipeg (CA); Robert Amborsky, Winnipeg (CA)

( * ) Notice: Subject to any disclaimer, the term of this patent is extended or adjusted under 35 U.S.C. 154(b) by 429 days.

This patent is subject to a terminal disclaimer.

(21) Appl. No.: 17/292,287

(22) PCT Filed: Nov. 7, 2019

(86) PCT No.: PCT/CA2019/051585
§ 371 (c)(1),
(2) Date: May 7, 2021

(87) PCT Pub. No.: WO2020/093161
PCT Pub. Date: May 14, 2020

(65) Prior Publication Data
US 2021/0388182 A1    Dec. 16, 2021

Related U.S. Application Data

(60) Provisional application No. 62/756,819, filed on Nov. 7, 2018.

(30) Foreign Application Priority Data

Apr. 11, 2019    (CA) .......................... CA2019/050442

(51) Int. Cl.
*B27N 1/02*    (2006.01)
*B27N 3/00*    (2006.01)
(Continued)

(52) U.S. Cl.
CPC .............. *C08L 1/02* (2013.01); *B27N 1/0209* (2013.01); *B27N 3/002* (2013.01); *B27N 3/007* (2013.01);
(Continued)

(58) Field of Classification Search
CPC ........ B27N 1/02; B27N 1/0209; B27N 3/002; B27N 3/007; B27N 3/02; B27N 3/04;
(Continued)

(56) References Cited

U.S. PATENT DOCUMENTS

| 6,253,527 | B1 * | 7/2001 | De Zen ............... | B29B 17/0042 |
| | | | | 264/68 X |
| 2015/0343739 | A1 * | 12/2015 | Pervan .................. | E04F 15/107 |
| | | | | 428/512 |
| 2021/0146577 | A1 * | 5/2021 | Gowdar .................. | B29B 17/04 |

FOREIGN PATENT DOCUMENTS

EP    1498241 A2 *    1/2005    ............. B27N 3/007

* cited by examiner

*Primary Examiner* — Leo B Tentoni
(74) *Attorney, Agent, or Firm* — Ryan W. Dupuis; Kyle R. Satterthwaite; Ade & Company Inc.

(57) ABSTRACT

A composite material is formed by preparing mass particles consisting of a fibrous material at least partially derived from recycled post-consumer materials and preparing particles of a binding material consisting of a thermoplastic material at least partially derived from recycled post-consumer material. The prepared mass particles and particles of binding material are mixed together such that the binding material liquifies and coats the mass particles which are subsequently then pressed together to form a composite article in which the mass particles typically occupy between (Continued)

35% and 60% by weight of the composite material and the binding material occupies between 40% and 60% by weight of the composite material. The composite material is suitable for replacing concrete, wood, or other construction, manufacturing or industrial materials, and possesses properties that in some applications may be equal or superior such materials.

19 Claims, 8 Drawing Sheets

(51) Int. Cl.
| | |
|---|---|
| *B27N 3/02* | (2006.01) |
| *B27N 3/04* | (2006.01) |
| *B29C 35/02* | (2006.01) |
| *B29C 43/00* | (2006.01) |
| *B29C 43/02* | (2006.01) |
| *B29C 65/56* | (2006.01) |
| *C08J 11/04* | (2006.01) |
| *C08L 1/02* | (2006.01) |
| *B29C 59/02* | (2006.01) |
| *B29C 70/42* | (2006.01) |
| *B29K 101/12* | (2006.01) |
| *B29K 105/26* | (2006.01) |

(52) U.S. Cl.
CPC ........ *B29C 35/0255* (2013.01); *B29C 43/003* (2013.01); *B29C 43/006* (2013.01); *C08J 11/04* (2013.01); *B29C 2059/027* (2013.01); *B29C 70/42* (2013.01); *B29K 2101/12* (2013.01); *B29K 2105/26* (2013.01); *C08J 2301/02* (2013.01); *C08J 2401/02* (2013.01); *C08L 2203/30* (2013.01); *C08L 2205/16* (2013.01); *C08L 2207/20* (2013.01)

(58) Field of Classification Search
CPC ..... B29B 17/02; B29B 17/04; B29C 35/0255; B29C 43/003; B29C 43/006; B29C 43/02; B29C 2059/027; B29C 65/56; B29K 2105/26
USPC ......... 264/29.1, 68, 115, 122, 162, 913, 914
See application file for complete search history.

MATERIAL CREATED FROM POLYMER AND OTHER MASS WHICH IS ENTIRELY, PARTIALLY OR SUBSTANTIALLY COMPOSED OF RECLAIMED MIXED MATERIAL

This application claims priority to U.S. provisional application Ser. No. 62/756,819, filed Nov. 7, 2018.

FIELD OF THE INVENTION

This relates to the formation of a reconstituted material from a combination of polymers and mass, and which can replace current materials including wood, plastic, concrete, and rubber for residential, commercial and industrial applications.

Background

Landfills have long been a cheap and convenient means of disposing of waste, but are toxic environments that contaminate air, water and soils. Landfills are also significant sources of greenhouse gases and contribute to global climate change. As such, there are mounting reasons for cities and municipalities to seek alternatives.

Incineration is another form of waste disposal, which creates toxic emissions and health impacts for human communities and ecosystems.

To mitigate the negative impacts of waste disposal, some waste materials are recycled into new products. Markets currently exist for certain material, including newsprint, aluminum cans, metal cans, certain types of plastics, and other types of recyclable materials.

Not all waste materials can be easily recycled, primarily due to (1) the costs and resources required to separate out the various types of materials and (2) the issue of contamination. Mixed plastic waste, for example, exists in abundance throughout the environment, including oceans, beaches, rivers, lakes and other waterways, as well as forests, mountains, plains, deserts and human-made environments.

The labour involved in sorting through all types of waste material and separating out separate material types is cost prohibitive. Despite advances in automatic sorting machines, systems and processes, sorting is often inaccurate and incomplete.

Contamination of materials (such as the presence of food waste, packaging, multiple or laminated materials, or embedded metals or other contaminants) can confound even the most accurate systems or pose dangers to employees who manually sort waste.

SUMMARY OF THE INVENTION

According to one aspect of the present invention there is provided a composite material consisting of:
 a plurality of mass particles consisting of a fibrous material at least partially derived from recycled post-consumer materials; and
 a binding material consisting of a thermoplastic material at least partially derived from recycled post-consumer materials.

According to another aspect of the present invention there is provided a composite material comprising:
 a plurality of mass particles occupying between 35% and 60% by weight of the composite material;
 the mass particles consisting of a fibrous material at least partially derived from recycled post-consumer materials;
 the mass particles having an average particle size in the range of 1 to 50 millimeters;
 a binding material occupying between 40% and 60% by weight of the composite material;
 the binding material consisting of a thermoplastic material at least partially derived from recycled post-consumer materials; and
 each mass particle being substantially fully encapsulated by the binding material.

According to a further aspect of the present invention there is provided a method of forming an article of composite material, the method comprising:
 deriving a plurality of mass particles consisting of a fibrous material at least in part from recycled post-consumer materials such that the mass particles have an average particle size in the range of 1 to 50 millimeters;
 deriving a binding material consisting of a thermoplastic material at least in part from recycled post-consumer materials;
 mixing the mass particles and the binding material such that the mass particles occupy between 35% and 60% by weight of the article and the binding material occupies between 40% and 60% by weight of the article;
 heating the binding material before or during mixing such that the binding material is substantially liquified and each mass particle is substantially fully encapsulated by the liquified binding material;
 pressing the encapsulated mass particles together to form a block of material; and
 shaping the block of material to form the article.

The composite material described herein is an innovative new material that is composed of a thermoplastic material (referred to herein as Poly) and mass particles consisting of a fibrous material (referred to herein as Mass) and may include or be entirely, partially or substantially composed of Reclaimed Mixed Material and may also include Contaminated Material.

The composite material described herein will help to reduce global waste accumulation and the need for new or virgin wood and concrete in economic domains such as construction, infrastructure, transportation, logistics and manufacturing. Across a range of applications, the composite material described herein is suitable for replacing concrete, wood, or other construction, manufacturing or industrial materials, and possesses properties that in some applications may be equal or superior such materials.

In some embodiments, the binding material within the composite material consists of a single type of thermoplastic material; however, two or more different binding materials may also be used.

The method may include shaping the block of material to form the article by cutting the block of material to produce cuttings, and mixing the cuttings with the mass particles and the binding material in the formation of a second article.

The method may include directly forming the article after mixing while the binding material remains heated.

Alternatively, the method may include, before forming the block, cooling the encapsulated mass particles, transporting the encapsulated mass particles to a secondary manufacturing location, heating the encapsulated mass particles at the secondary manufacturing location, and pressing the encapsulated mass particles to form the block of material and shaping the block of material to form the article at the secondary manufacturing location.

The method may include mixing the mass particles and the binding material such that the mass particles occupy between 40% and 60% by weight of the article.

The method may include preparing the binding material to have an average particle size which is approximately equal to the average particle size of the mass particles prior to mixing the mass particles and the binding material.

Alternatively, the method may include preparing the binding material to have an average particle size which is less than the average particle size of the mass particles prior to mixing the mass particles and the binding material.

The method may include preparing the binding material as a plurality of solid particles for mixing with the mass particles and heating the binding material during the mixing to liquify the binding material.

The method may include preparing the binding material as a plurality of solid particles for mixing with the mass particles and heating the binding material to liquify the binding material during mixing solely by frictional forces generated during mixing without any externally applied heat.

The method may include drying the mass particles to have a moisture content of less than 10% prior to mixing with the binding material. More preferably, the method includes drying the binding material to have a moisture content of less than 2% prior to mixing with the mass particles.

The binding material preferably has a pyrolysis temperature which is lower than a pyrolysis temperature of the mass particles. In this instance, the method may include heating the binding material during the mixing such that the binding material undergoes partial pyrolysis. Preferably the binding material is heated such that the binding material undergoes 50% of full pyrolysis.

The composite article is preferably substantially non-porous.

The mass particles may have an average particle size in the range of 3 to 12 millimeters. Alternatively, the mass particles may have a maximum particle size in the range of 3 to 12 millimeters.

Preferably any voids in the composite component are smaller in size that the average particle size of the mass particles.

An average thickness of the encapsulating binding material about the mass particles is preferably less than the average particle size of the mass particles.

The mass particles may (i) consist only of particles formed of cellulose fibres, (ii) consist of particles formed of both synthetic fibres and cellulose fibres, or (iii) consist only of particles formed of synthetic fibres.

The composite component preferably has a density in a range of 0.75 to 0.95 grams per cubic centimeter, and more preferably near 0.83 grams per cubic centimeter.

The composite component may have a compressive strength which is greater than 1500 psi, and more preferably which is greater than 2000 psi.

The composite component may incorporate organic waste derived from the recycled post-consumer materials in which the organic waste occupies less than 3% by weight of the composite material.

Preferably the mass particles are fully derived from recycled post-consumer materials. Preferably the binding material is also fully derived from recycled post-consumer materials.

The composite article may be shaped by sanding, and/or subsequently joined to another object using a nail or a screw penetrated through the article.

In this application, Poly refers to any type of thermoplastic.

In this application, Mass refers to any material that includes, but is not limited to, wood, wood fibers or wood derivatives, paper of all types, including laminated or layered papers, consumer packaging, clothing, carpets and textiles, fiberglass or other natural or manufactured fibers, agricultural, plant or organic matter or fibers, thermoset plastics, or any other material suitable for binding to thermoplastic material.

PolyMass refers to any material that is composed of both Poly and Mass material and may be composed entirely, partially or substantially of Reclaimed Mixed Material.

Reclaimed Mixed Material refers to any of Poly material or Mass material that could be defined or commonly understood as waste or post-consumer material by one or any of, but not limited to, the following terms: recovered, reclaimed, recycled, land-fill diverted, waste-stream diverted, mixed recycling, co-mingled, difficult-to-recycle, contaminated, salvaged, un-useable, un-wanted, un-marketable, defective, and construction, demolition and renovation (CDR) waste.

Thermoplastic refers to any class of plastics or polymers that become melted and/or achieve a liquid or semi-liquid state at sufficient temperature, and that will re-solidify upon cooling.

Thermoset refers to a class of plastics or polymers that once formed cannot be melted or remolded. At sufficient temperature, such plastics will combust rather than melt.

Contaminated Material refers to any material unintentionally or incidentally introduced to the PolyMass material or manufacturing process that possesses a low surface energy and high contact angle, and may include but is not limited to organic, metallic, mineral, or toxic material.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Referring to the accompany figures there is illustrated a composite material and a method of producing the composite material to form an article.

The composite material is manufactured primarily using two main components comprising (i) mass particles 40 defining a reinforcing material which is typically fibrous in structure, and (ii) a binding material 42 consisting of thermoplastic materials which are used to encapsulate the mass particles 40 and bind the mass particles relative to one another to define the composite material which forms each composite component. Typically, the mass particles 40 and the binding material 42 are derived at least partially, or more preferably entirely from recycled post-consumer waste materials.

The mass particles 40 may be formed of a material comprising cellulose fibers or synthetic fibers or a combination thereof. Suitable reinforcing material to form the mass particles include (i) wood derived from commercial, industrial construction, demolition, renovation, and the like, (ii) paper derived from waste paper, newsprint, shredded office paper, cardboard, and the like, (iii) textiles such as clothing, fabric, weaves, carpets, stuffing, upholstery and the like, (iv) fiberglass including insulation, fiberglass strands of various types, fiberglass pieces, and the like, (v) forestry by-products including diseased trees, branches, sawdust, and the like, and (vi) agricultural derived products including straw, flax shives, hemp, and the like.

The binding material 42 is a thermoplastic material which is capable of being melted or liquefied under application of heat for coating and encapsulating the mass particles 40. Suitable binding materials include (i) polyethylene terephthalate including water and pop bottles, fleece garments, carpets, upholstery stuffing and the like, (ii) high density polyethylene including milk jugs, laundry detergent bottles, shampoo bottles, toys and the like, (iii) polyvinylchloride including oil containers, toys, drainpipes, hoses, window and door frames, and the like, (iv) low density polyethylene including food wrap, dry cleaner bags, bread bags, squeeze bottles, and the like, (v) polypropylene including disposable diapers, plastic bottle tops, yogurt containers, straws and the like, (vi) polystyrene including plastic cutlery, coffee cup lids, take-out containers, egg cartons, and the like, but excluding expanded polystyrene such as Styrofoam®, and (vii) other types of thermoplastics including acrylic, polycarbonate, polylactic fibers, nylon, bisphenol a, baby bottles, sippy cups, and the like.

The mass particles 40 are typically prepared by initially providing a recycled product, for example formed of wood, followed by breaking up of the product into smaller particles by various means including cutting, chipping, grinding and the like in order to reduce the recycled product into a plurality of mass particles having an average particle size in the range of 1 to 50 millimetres across. The mass particles 40 may include much smaller particles presented as a fine dust as a result of the mechanical process of reducing the size of the particles. In some embodiments, the mass particles may consist only of a fine dust; however, it is preferred that the average and/or maximum particle size be in the range of ⅜ to ½ of an inch in diameter, or more particularly in the range of 3 to 12 millimeters in diameter, optionally with some particles being greater than half an inch in size. Mass particles are dried so as to have a moisture content of less than 10%.

The thermoplastic material defining the binding material 42 is also prepared by initially providing a recycled product followed by breaking up of the product into smaller particles by various means including cutting, chipping, grinding and the like in order to reduce the recycled product into a plurality of smaller particles also having an average and/or maximum particle size in the range of 1 to 50 millimeters across, and more preferably in the size range of 3 to 12 millimeters. The binding material is prepared as solid particles prior to mixing with the mass particles. The particle size of the binding material is less critical as the binding material is intended to be liquefied under heat in subsequent stages; however, a particle size which is similar to or less than the particle size of the mass particles 40 provides for more even distribution of the binding material 42 relative to the mass particles 40 during initial mixing. The binding material 42 is typically dried to a moisture content of less than 2% prior to mixing with the mass particles.

Once the mass particles 40 and the binding material 42 have been suitably prepared, the solid particles can be mixed together with one another in a suitable mixer such as a batch mixer or a continuous flow mixer feeding an extruder for example. The mixture within the mixer for forming the composite components typically consists of (i) mass particles 40 in the range of 35% to 60% by weight of the finished composite material, or more preferably 40% to 60% by weight of the finished composite material, and (ii) binding material 42 in the range of 40% to 65% by weight of the finished composite material.

A small amount of garbage waste material can be incorporated into the composite material forming the composite components, such as organic waste accompanying some of the post-consumer material from which the mass particles or the binding material was derived. This organic waste material may occupy up to 3% by weight of the finished composite material.

The materials described above are uniformly distributed throughout the mixing vessel by mixing in a manner that causes heating of the mixture. In a preferred embodiment, the mixer includes a vessel with one or more mixing elements that are movable within the vessel for mixing the mass particles and the solid particles of binding material. The mixing elements are operated at a suitable speed to generate frictional forces such that the heat generated by the frictional forces is sufficient to heat the mixture and melt or liquify the binding material so that the liquified and melted binding material coats the mass particles without any external heating input being required.

In preferred embodiments, the average pyrolysis temperature of the binding materials is less than the average pyrolysis temperature of the mass particles so as to enable heating the mixture to a degree which causes the binding materials 42 to undergo partial pyrolysis, preferably near 50% of full pyrolysis without the mass particles undergoing any substantial degree of pyrolysis to maintain the structure of the mass particles.

Figure 1:
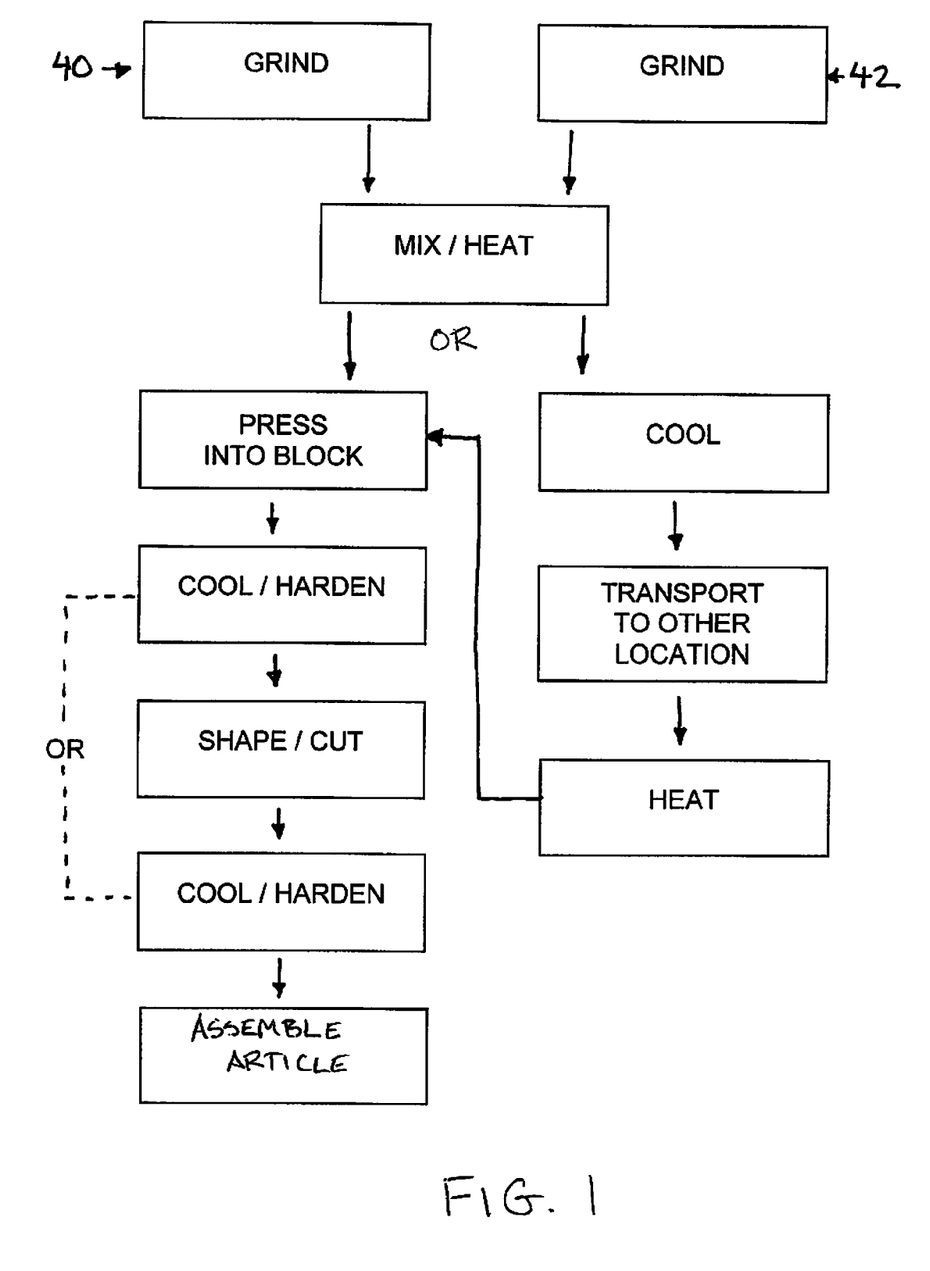
FIG. 1 is a flow chart illustrating a manufacturing process for manufacturing a composite material from post-consumer waste material and forming the material into an article.
Figure 2:
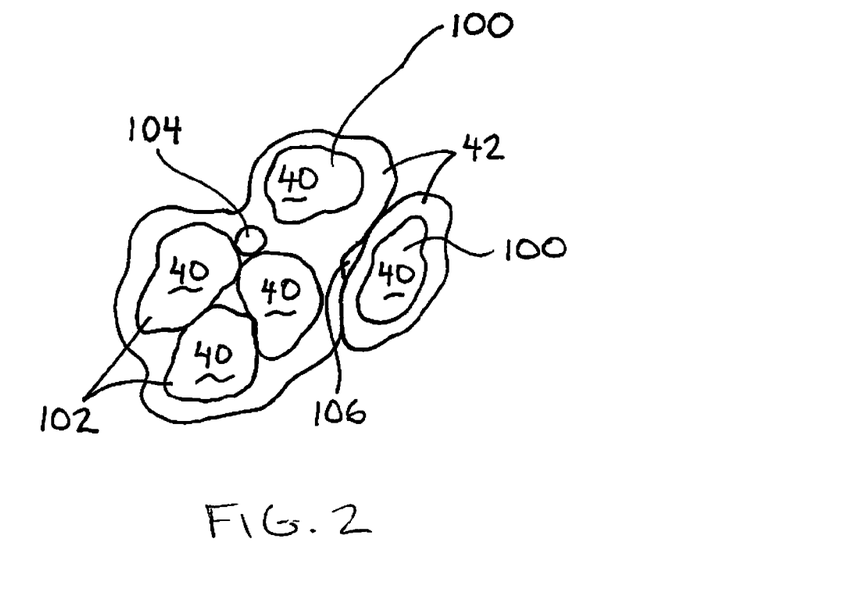
FIG. 2 is a schematic representation of an exemplary composition of the composite material.

The friction from mixing of the mixture of mass particles 40 and the binding material 42 is sufficient to cause all of the binding material 42 to be melted and substantially liquefied so as to fully coat and encapsulate each of the mass particles by either coating each individual particle 100 or by fully coating an agglomeration of two or more agglomerated particles 102 as shown generally in FIG. 2. The liquefied binding material 42 enables the mass particles 40 to be bonded relative to one another once the binding material has cooled to a hardened state.

Any waste particles 104, derived from the organic waste for example, can be similarly encapsulated and fully contained within the matrix of binding material in the completed composite component so as to have minimal or no detrimental effects to the structural properties of the completed composite component.

The completed composite component may also include some voids 106 however, when forming the composite components, the composite material is typically sufficiently compressed to minimize the size of the voids such that the average dimension of the voids tends to be much smaller than the average particle size of the mass particles 40. Furthermore, the average thickness of the encapsulating binding material about the mass particles is less than the average particle size of the mass particles. The completed composite component is typically formed of material which has been sufficiently compressed that the composite material is substantially nonporous having a density in the range of 0.75 to 0.95 g/cm$^3$, and most preferably near 0.830 g/cm$^3$. This results in the composite material having a compressive strength which is typically greater than 1500 psi, and more preferably greater than 2000 psi.

Once a raw composite material has been prepared subsequent to the mixing and heating stage, the raw composite material may be placed directly into suitable forms using a press or may be pressed into shape using an extruder for example to immediately form a complete block of material. The block of material may directly correspond to the dimensions of a composite component of the article being manufactured or alternatively, the block of material which is formed by pressing the raw composite material can be further shaped by cutting, sanding and the like after removal from a suitable form.

Additional cutting or shaping of the material of various forms can occur prior to the block of material being fully cooled and hardened, or subsequent to cooling and hardening of the block. In either instance, where cutting of the block of material to reduce the size into a finished composite article occurs which results in formation of cuttings, the cuttings are typically collected and then added to a subsequent batch mixture for forming additional composite articles.

Once a cooled and hardened composite article has been formed, the composite article can then be mounted at the appropriate location within the object to be manufactured using various fasteners or adhesive and the like for securement to other components. This includes nailing, or screwing, or bolting composite articles together or to other objects in the same manner as assembly of an object from wood components.

In an alternative arrangement, the raw composite material resulting from the heating and mixing stage can be allowed to cool for storage or for transport to a second manufacturing location. This raw composite material effectively comprises a plurality of mass particles which have been fully encapsulated by the binding material 42 but which have not yet been pressed and formed into a block of material having the desired density of the finished composite article. This raw composite material can be used at a second manufacturing location to form the composite article by re-heating and pressing the raw composite material into a suitable form with a press or a screw extruder for example to form the block of material described above which can then be shaped, for example by cutting either before or after the block of material has fully cooled and hardened. Again, any cuttings collected from a cutting process can be recycled back into the mixer for mixing with a subsequent batch of mass particles and binding material.

Turning now to FIGS. 3 through 15, various examples of the types of particles found within the prepared composite material will now be discussed.

Figure 3:
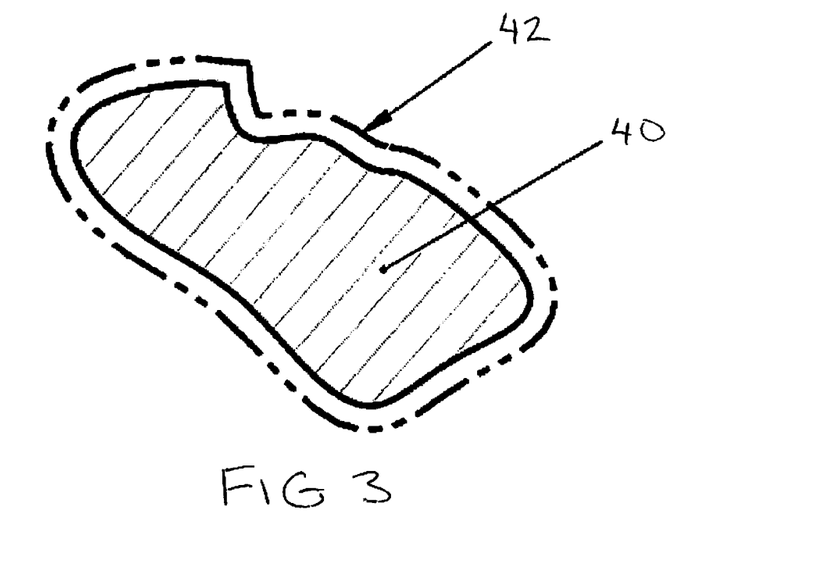
FIG. 3 is an example of Poly coated Mass, where Mass surface area is covered with and bonded to a single type of melted and/or liquid Poly. In the alternative, Mass is a piece of non-melted Poly with a melted outer surface area.

In the most basic form, as shown in FIG. 3, the composite material may primarily be comprised of mass particles 40 which are coated uniformly with a single type of binding material 42 which is liquefied during mixing for bonding with adjacent particles. In some instances, the binding material 42 may remain in some parts as particles similar in size to the mass particles 40 in which only an outer surface portion of the binding material particle is liquefied during heating for bonding to adjacent particles.

Figure 4:
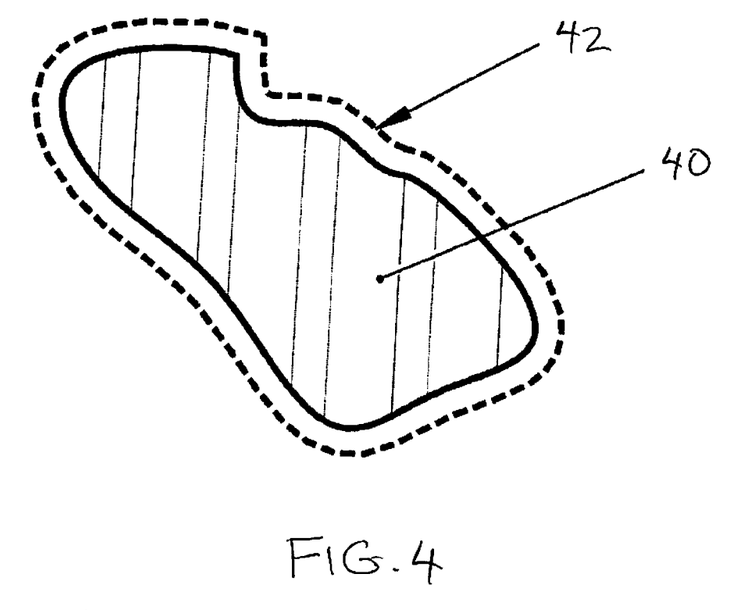
FIG. 4 is an example of mixed Poly coated Mass, where Mass surface area is covered with and bonded to a mixture of two or more than two types of melted and/or liquid Poly.

Alternatively, as represented in FIG. 4, the composite material may also be comprised of mass particles 40 which are coated uniformly with two or more different types of binding materials 42 which are melted together as a uniform binding mixture surrounding each mass particle 40 in a liquefied layer during the heating and mixing stage for binding to adjacent particles.

Figure 5:
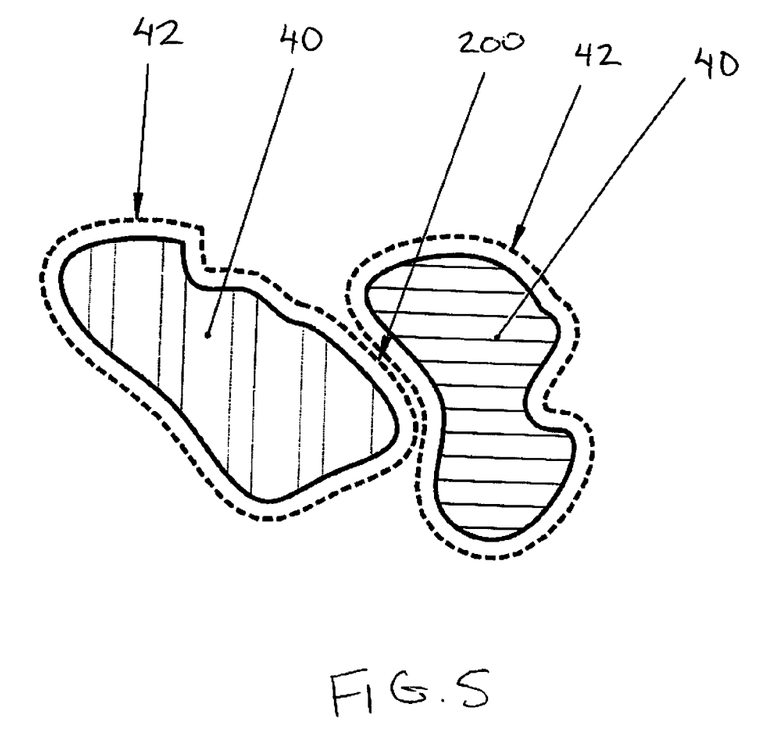
FIG. 5 is an example of Poly bonding to Poly, where Mass covered with Poly is bonded by Poly contacting with Poly to Mass covered with Poly.

As shown in FIG. 5, the mass particles 40 may comprise two different types of fibrous material which are uniformly coated with the same or different binding material 42 as a liquefied layer during the heating and mixing stage such that the adjacent mass particles are bonded together by an interface 200 of binding material about the first mass particle bonded to binding material about the second mass particle.

Figure 6:
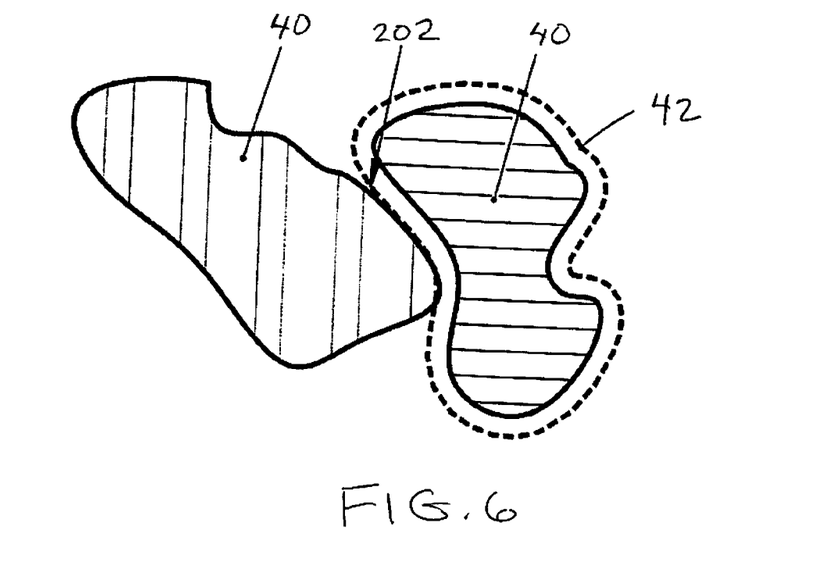
FIG. 6 is an example of mass coated with Poly bonded to an uncoated Mass. Mass covered with melted and/or liquid Poly bonds and/or adheres to a non-coated Mass by contact with the Poly and the Mass.

As shown in FIG. 6, in some instances, some of the mass particles 40 may be uniformly coated with liquefied binding material 42 during the mixing and heating stage, while other mass particles may be substantially uncoated, however the particles are still able to be bonded together in the finished composite material by bonding at an interface 202 in which the liquefied binding material about the first mass particle is directly bonded or adhered to the uncoated second mass particle.

Figure 7:
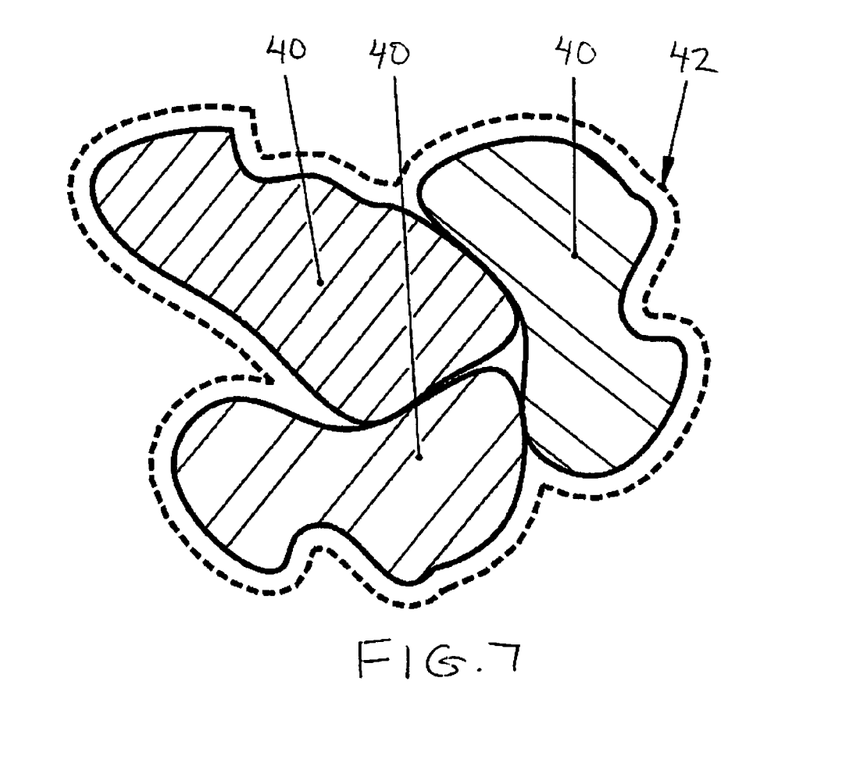
FIG. 7 in an example of multiple Masses surrounded by Poly where two or more Masses are surrounded as a group by a melted and/or liquid Poly, that binds them together as a group.

As shown in FIG. 7, a plurality of the mass particles 40 may directly contact one another while remaining bonded relative to one another as the entire group of mass particles are fully surrounded by a uniform coating of the liquefied binding material during the heating and mixing stage so that each individual mass particle effectively remains fully encapsulated by the binding material in the finished composite material.

Figure 8:
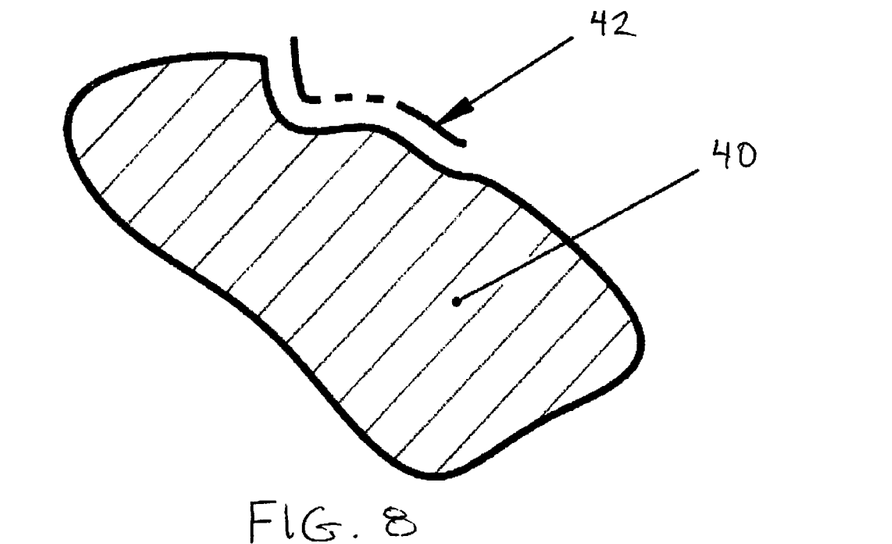
FIG. 8 in an example of Mass partially coated with Poly.

As shown in FIG. 8, in some instances some of the mass particles 40 may be only partially coated with liquefied binding material 42 during the heating and mixing stage; however, this does not interfere with binding of the mass particles 40 relative to one another in the finished composite material due to adjacent mass particles 40 being either partially or fully coated with liquefied binding material such that each mass particle in a conglomerated group of mass particles 40 is effectively fully coated by the coating of liquefied binding material 42 which fully surrounds the conglomerated group of mass particles.

Figure 9:
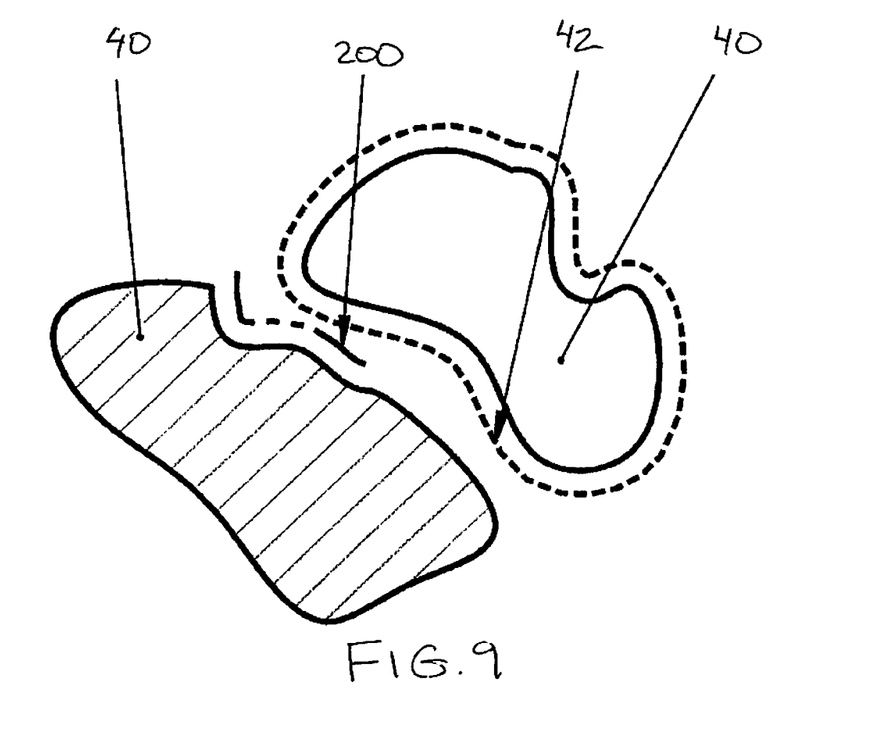
FIG. 9 in an example where melted and/or liquid Poly covered Mass bonded by Poly to Poly contact and Poly to Mass contact to a partially Poly covered Mass.

As shown in FIG. 9, a first mass particle 40 that is fully coated with liquefied binding material 42 during the heating and mixing stage is bonded to a second mass particle 40 that is only partially coated with liquefied binding material 42 during the heating and mixing stage at an interface 200 in which the binding material coating from the first mass particle binds to the binding material coating of the second mass particle.

Figure 10:
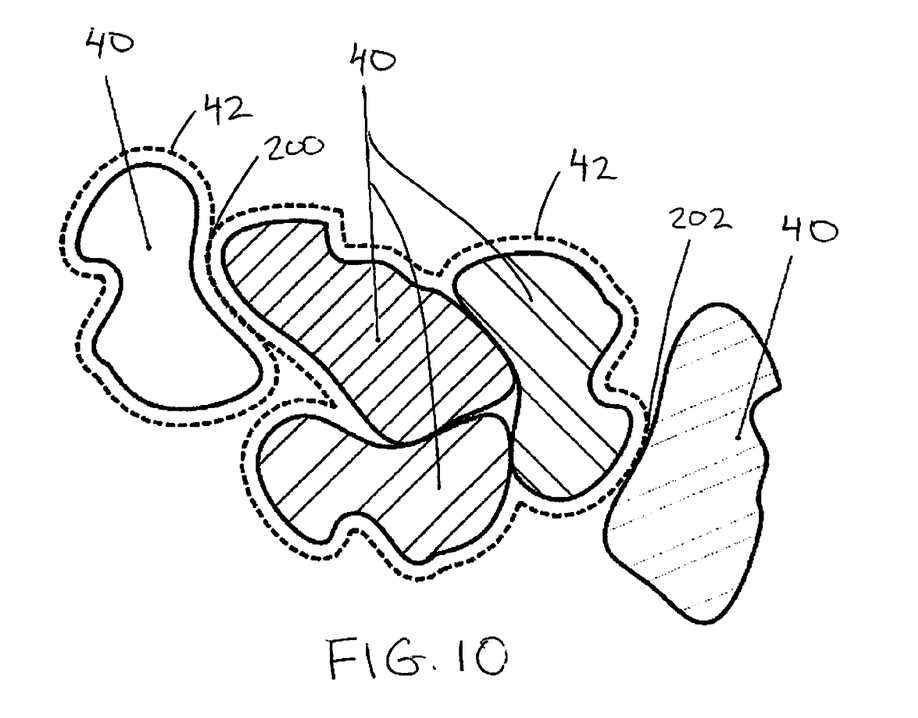
FIG. 10 is an example whereby a conglomerate of Masses are bonded together. A melted and/or liquid Poly covered mass is bonded by Poly to Poly contact to a Poly surrounded group of Masses bonded by poly to Mass surface contact of an uncoated

FIG. 10 illustrates a conglomerate of mass particles 40 joined together by direct contact between the mass particles while being bonded together by a uniform liquefied coating of binding material 42 which fully surrounds the conglomerate. The conglomerate of mass particles is then able to be joined to (i) other mass particles 40 which may be coated with liquefied binding material 42 during the heating and mixing stage by an interface 200 of binding material joined to binding material or (ii) to other mass particles 40 which may remain substantially uncoated by an interface 202 of binding material from the conglomerate of mass particles binding directly to the uncoated mass particle 40.

Figure 11:
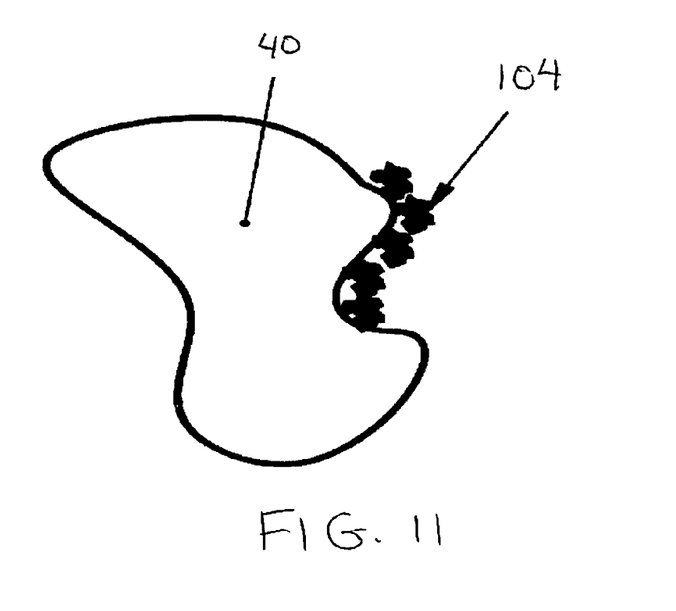
FIG. 11 is an example of Mass with partial contamination of its surface area.
Figure 12:
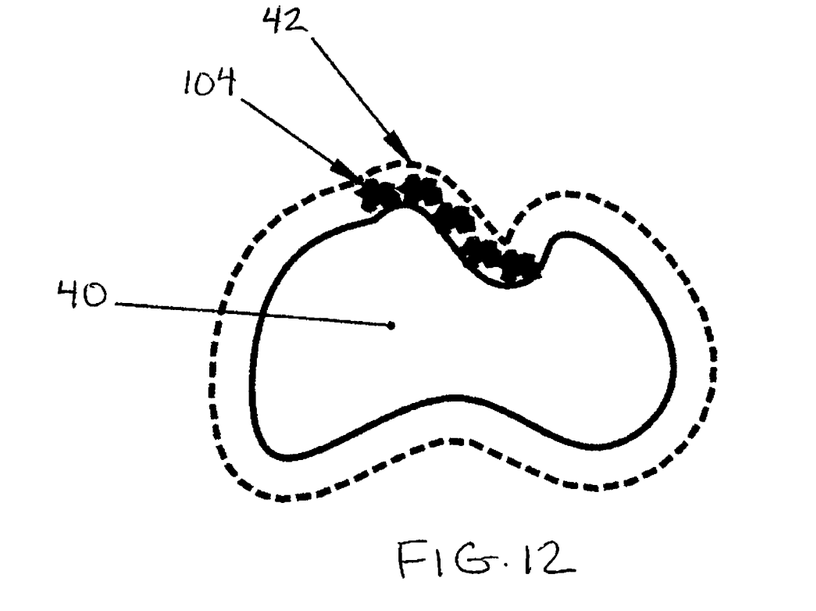
FIG. 12 is an example of Mass coated with Poly with partial contamination. The Mass with partial contamination of its surface area is covered with Poly where the Poly bridges over the contamination.

As shown in FIG. 11, some of the mass particles 40 may include contaminated particles 104 on the surface thereof. The contaminated material 104 can be incorporated into the composite material without substantially interfering with the structural integrity thereof by various mechanisms. This includes the contaminated particles 104 being fully encapsulated by the liquefied binding material 42 which forms a uniform coating surrounding both the mass particle and the contaminated particles 104 on the surface of the mass particles as shown in FIG. 12.

Figure 13:
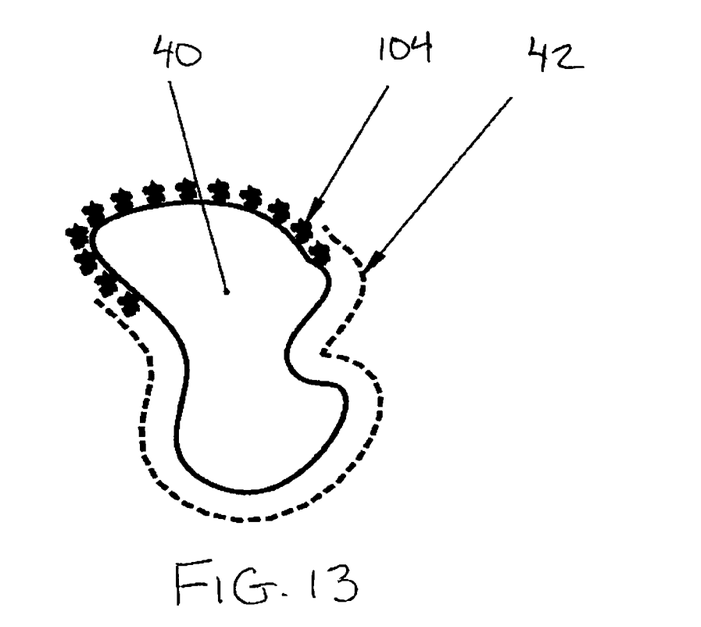
FIG. 13 in an example of Mass with a large area of contamination where the Poly is unable to bridge over the contamination leaving a surface area that is unable to bond to any other Mass.
Figure 14:
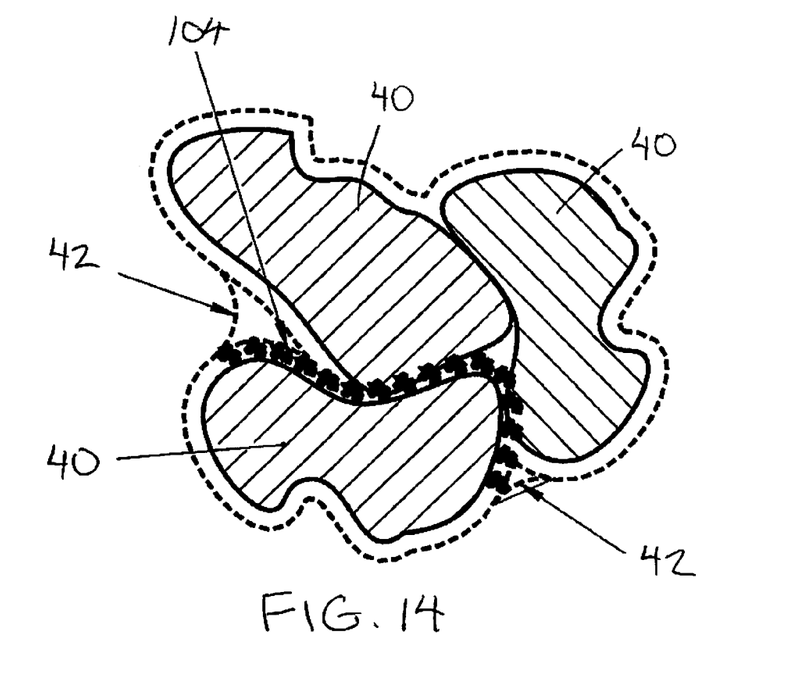
FIG. 14 is an example of mass with a large area of contamination coated and captured by liquid and/or melted Poly into a multiple mass.

Alternatively, as shown in FIG. 13, in some instances contaminated material 104 is provided on the surface of a mass particle 40 which is partially coated with liquefied binding material 42 during the heating and mixing stage so that the contaminated material 104 is not fully encapsulated. In this instance the mass particle 40 having some exposed contaminant thereon can form part of a conglomerate of mass particles as shown in FIG. 14 in which a uniform coating of liquefied binding material 42 fully encapsulates the conglomerate of mass particles 40 with the contaminant particles 104 contained therein again resulting in each mass particle effectively being fully encapsulated by the binding material in the manufactured composite material.

Figure 15:
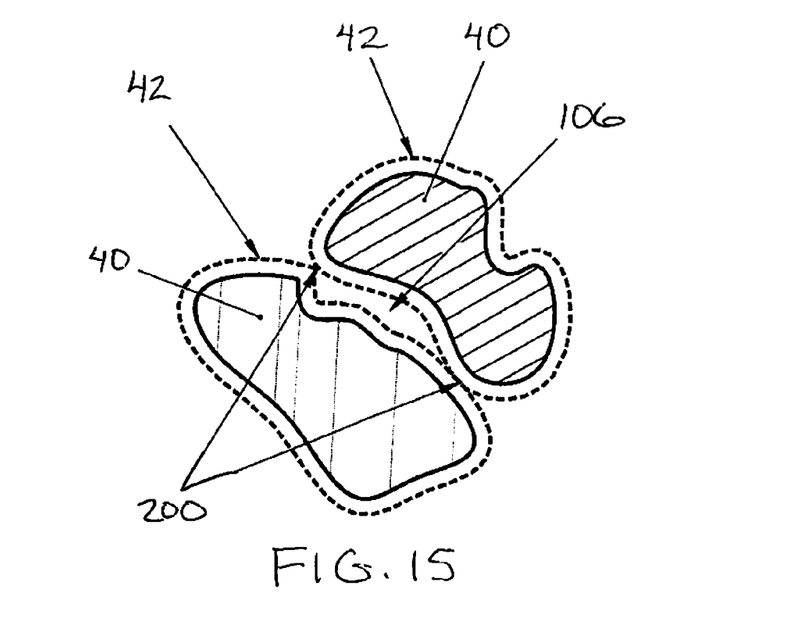
FIG. 15 is an example of two Poly coated Masses with air and/or space between the Masses. Mass covered in Poly is bonded by Poly to Poly contact to Mass covered with Poly with space between the two. Compression of the Poly and the Mass reduces the air spaces.

As shown in FIG. 15, in some instances, adjacent mass particles 40 may be each fully or partially coated by liquefied binding material 42 during the heating and mixing stage in which the adjacent particles are bonded together at two or more interfaces 200 consisting of binding material 42 from the first mass particle joined to binding material 42 of the second mass particle, in a manner which results in some voids 106 being trapped between the adjacent particles.

Due to the pressure exerted when forming a block of the composite material, together with the ability of the liquefied coating of binding material 42 to vary in thickness as the mass particles are pressed together, and the ability of the mass particles to be somewhat resilient in some instances, the size of the voids 106 can be minimized. In a preferred arrangement, the size of the voids is minimized so that the voids are fully encapsulated and separated from one another, resulting in the material being substantially non-porous. In this instance, the resulting article formed of composite material absorbs less than 1% of its weight in water when submerged.

As described herein, the composite material according to the present invention is referred to herein as PolyMass and is composed of two main constituents of Poly and Mass.

The material defined as Poly, or binding material 42, may include one or any of a number of Thermoplastics such as, but not limited to, acrylonitrile butadiene styrene, polyethylene terephthalate, high-density polyethylene, low-density polyethylene, polypropylene, polycarbonate, polylactic acid, polystyrene, nylon, polyester, or polyvinyl chloride.

The material defined as Mass, or mass particles 40, includes any material that is not defined as Poly and may include, but is not limited to, material such as wood, wood fibers or wood derivatives, paper of all types, including laminated or layered papers, consumer packaging, clothing, carpets and textiles, fiberglass or other natural or manufactured fibers, agricultural, plant or organic matter or fibers, thermoset plastics, or other suitable material and that may be adhered to or physically or chemically bind to a Poly material.

Either or both Poly and/or Mass material may be entirely, partially or substantially Reclaimed Mixed Material.

The Reclaimed Mixed Material refers to any Poly or Mass material that could be classified as waste or post-consumer material by one or any of, but not limited to, the following terms: recovered, recycled, land-fill diverted, waste-stream diverted, mixed recycling, co-mingled, difficult-to-recycle, contaminated, salvaged, unusable, unwanted, unmarketable, defective, and construction, demolition and renovation (CDR) waste.

The PolyMass material must include at least a portion of both Poly and Mass. In some instance, the proportion of the Poly component of a PolyMass material can be between 5% Poly to 95% Poly.

Creating or preparing the PolyMass material can include shredding or granulating all or some of the Poly and/or Mass materials to a particle size of between 1 mm to 50 mm.

Creating or preparing the PolyMass material can include the mixing or blending of the constituent Poly and Mass materials sufficiently to achieve a homogenous distribution of Poly and Mass.

Creating or preparing the PolyMass material can include the heating of the mixed materials such that some or all the Poly material is caused to melt or achieve a liquid or semi-liquid state.

Creating or preparing the PolyMass material allows for the coating, adhering, and/or physical or chemical binding of the melted Poly to the Mass.

Creating or preparing the PolyMass material may or may not include the shaping, molding, forming and/or fusing at high-pressure of the mixed, heated, and coated materials such that the resulting material is a solid material.

The PolyMass material may be produced but not shaped, molded, formed or fused at high pressure until a later time or date in the future.

Creating or preparing the PolyMass material can include any known and unknown means of substantially mixing or blending materials thoroughly.

Creating or preparing the PolyMass material can include any known and unknown means of heating materials to achieve a melted, liquid or semi-liquid state.

Creating or preparing the PolyMass material can include any known and unknown means of allowing for the coating, adhering, and/or binding of Poly material to Mass material.

Creating or preparing the PolyMass material can include any known and unknown means of shaping, molding, forming and/or fusing forming under pressure the mixed, heated, and coated materials such that the resulting material is a solid composite material.

Creating or preparing the PolyMass material can include the unintentional or incidental introduction of Contaminated Material to the materials or methods such that melted Poly material may be coated, adhered to or bound to Contaminated Material and/or Mass material without decreasing the overall strength of the PolyMass material.

Creating or preparing the PolyMass material can result in formed, cooled and solid PolyMass material that possesses physical properties that compare favorably to concrete, including but not limited to similar compressive strength and insect resistance.

Creating or preparing the PolyMass material can result in formed, cooled and solid PolyMass material that possesses physical properties that exceed those of concrete, including but not limited to superior impact resistance, flexural strength, insulation value, and resistance to water absorption.

Creating or preparing the PolyMass material can result in formed, cooled, and solid PolylMass material that possesses physical properties that compare favorably to wood or lumber, including but not limited to similar compressive strength, impact resistance and flexural strength.

Creating or preparing the PolyMass material can result in formed, cooled, and solid PolylMass material that possesses physical properties that exceed to wood or lumber, including but not limited its resistance to cracking, splitting, bowing, cupping, creaking, checking, kinking, crooking, twisting or other types of malformation, and includes as well as fire.

Creating or preparing the PolyMass material can result in formed, cooled, and solid PolylMass material that possesses physical properties that exceed to wood or lumber, including but not limited its resistance to moisture, mold, decay, and fire.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A method of forming an article of composite material, the method comprising:
    deriving a plurality of mass particles consisting of a fibrous material at least in part from recycled post-consumer materials such that the mass particles have an average particle size in the range of 1 to 50 millimeters;
    deriving a binding material consisting of a thermoplastic material at least in part from recycled post-consumer materials;
    mixing the mass particles and the binding material such that the mass particles occupy between 35% and 60% by weight of the article and the binding material occupies between 40% and 60% by weight of the article;
    heating the binding material before or during mixing such that the binding material is substantially liquified and each mass particle is substantially fully encapsulated by the liquified binding material;
    pressing the encapsulated mass particles together to form a block of material; and
    shaping the block of material to form the article;
    wherein the composite material of the article has a density in a range of 0.75 to 0.95 grams per cubic centimeter.

2. A method of forming an article of composite material, the method comprising:
    deriving a plurality of mass particles consisting of a fibrous material at least in part from recycled post-consumer materials such that the mass particles have an average particle size in the range of 1 to 50 millimeters;
    deriving a binding material consisting of a thermoplastic material at least in part from recycled post-consumer materials;
    mixing the mass particles and the binding material such that the mass particles occupy between 35% and 60% by weight of the article and the binding material occupies between 40% and 60% by weight of the article;
    heating the binding material before or during mixing such that the binding material is substantially liquified and each mass particle is substantially fully encapsulated by the liquified binding material;
    pressing the encapsulated mass particles together to form a block of material; and
    shaping the block of material to form the article by cutting the block of material to produce cuttings, and mixing the cuttings with the mass particles and the binding material in the formation of a second article.

3. A method of forming an article of composite material, the method comprising:
    deriving a plurality of mass particles consisting of a fibrous material at least in part from recycled post-consumer materials such that the mass particles have an average particle size in the range of 1 to 50 millimeters;
    deriving a binding material consisting of a thermoplastic material at least in part from recycled post-consumer materials;
    mixing the mass particles and the binding material such that the mass particles occupy between 35% and 60% by weight of the article and the binding material occupies between 40% and 60% by weight of the article;
    heating the binding material before or during mixing such that the binding material is substantially liquified and each mass particle is substantially fully encapsulated by the liquified binding material;
    pressing the encapsulated mass particles together to form a block of material; and
    shaping the block of material to form the article;
    before forming the block, cooling the encapsulated mass particles, transporting the encapsulated mass particles to a secondary manufacturing location, heating the encapsulated mass particles at the secondary manufacturing location, and pressing the encapsulated mass particles to form the block of material and shaping the block of material to form the article at the secondary manufacturing location.

4. The method according to claim 1 including mixing the mass particles and the binding material such that the mass particles occupy between 40% and 60% by weight of the article.

5. The method according to claim 1 including preparing the binding material to have an average particle size which is approximately equal to the average particle size of the mass particles prior to mixing the mass particles and the binding material.

6. The method according to claim 1 including preparing the binding material to have an average particle size which is less than the average particle size of the mass particles prior to mixing the mass particles and the binding material.

7. The method according to claim 1 including preparing the binding material as a plurality of solid particles for mixing with the mass particles and heating the binding material during the mixing to liquify the binding material.

8. The method according to claim 1 including preparing the binding material as a plurality of solid particles for mixing with the mass particles and heating the binding material to liquify the binding material during mixing solely by frictional forces generated during mixing without any externally applied heat.

9. The method according to claim 1 including drying the mass particles to have a moisture content of less than 10% prior to mixing with the binding material.

10. A method of forming an article of composite material, the method comprising:
   deriving a plurality of mass particles consisting of a fibrous material at least in part from recycled post-consumer materials such that the mass particles have an average particle size in the range of 1 to 50 millimeters;
   deriving a binding material consisting of a thermoplastic material at least in part from recycled post-consumer materials;
   mixing the mass particles and the binding material such that the mass particles occupy between 35% and 60% by weight of the article and the binding material occupies between 40% and 60% by weight of the article;
   heating the binding material before or during mixing such that the binding material is substantially liquified and each mass particle is substantially fully encapsulated by the liquified binding material;
   pressing the encapsulated mass particles together to form a block of material;
   shaping the block of material to form the article; and
   heating the binding material during the mixing such that the binding material undergoes partial pyrolysis.

11. The method according to claim 1 wherein the article is substantially non-porous.

12. The method according to claim 1 wherein the mass particles have an average particle size in the range of 3 to 12 millimeters.

13. The method according to claim 1 wherein any voids in the composite material of the article are smaller in size that the average particle size of the mass particles.

14. A method of forming an article of composite material, the method comprising:
   deriving a plurality of mass particles consisting of a fibrous material at least in part from recycled post-consumer materials such that the mass particles have an average particle size in the range of 1 to 50 millimeters;
   deriving a binding material consisting of a thermoplastic material at least in part from recycled post-consumer materials;
   mixing the mass particles and the binding material such that the mass particles occupy between 35% and 60% by weight of the article and the binding material occupies between 40% and 60% by weight of the article;
   heating the binding material before or during mixing such that the binding material is substantially liquified and each mass particle is substantially fully encapsulated by the liquified binding material;
   pressing the encapsulated mass particles together to form a block of material; and
   shaping the block of material to form the article;
   wherein an average thickness of the encapsulating binding material about the mass particles is less than the average particle size of the mass particles.

15. The method according to claim 1 wherein the mass particles consist only of particles formed of cellulose fibres.

16. A method of forming an article of composite material, the method comprising:
   deriving a plurality of mass particles consisting of a fibrous material at least in part from recycled post-consumer materials such that the mass particles have an average particle size in the range of 1 to 50 millimeters;
   deriving a binding material consisting of a thermoplastic material at least in part from recycled post-consumer materials;
   mixing the mass particles and the binding material such that the mass particles occupy between 35% and 60% by weight of the article and the binding material occupies between 40% and 60% by weight of the article;
   heating the binding material before or during mixing such that the binding material is substantially liquified and each mass particle is substantially fully encapsulated by the liquified binding material;
   pressing the encapsulated mass particles together to form a block of material; and
   shaping the block of material to form the article;
   wherein the composite material of the article has a compressive strength which is greater than 1500 psi.

17. A method of forming an article of composite material, the method comprising:
   deriving a plurality of mass particles consisting of a fibrous material at least in part from recycled post-consumer materials such that the mass particles have an average particle size in the range of 1 to 50 millimeters;
   deriving a binding material consisting of a thermoplastic material at least in part from recycled post-consumer materials;
   mixing the mass particles and the binding material such that the mass particles occupy between 35% and 60% by weight of the article and the binding material occupies between 40% and 60% by weight of the article;
   heating the binding material before or during mixing such that the binding material is substantially liquified and each mass particle is substantially fully encapsulated by the liquified binding material;
   pressing the encapsulated mass particles together to form a block of material; and
   shaping the block of material to form the article;
   wherein the composite material of the article incorporates organic waste derived from the recycled post-consumer materials in which the organic waste occupies less than 3% by weight of the composite material.

18. The method according to claim 1 including shaping the article by sanding.

19. The method according to claim 1 including joining the article to another object using a fastener penetrated through the article.

* * * * *